Sept. 2, 1952 J. R. MOOREHEAD ET AL 2,608,819
COLLECTOR RING MOUNT
Filed Sept. 27, 1946 2 SHEETS—SHEET 1

*INVENTORS*
JAMES R. MOOREHEAD
RICHARD S. REINHOLD
BY Reynolds & Beach
ATTORNEYS Patented Sept. 2, 1952

2,608,819

UNITED STATES PATENT OFFICE 2,608,819

COLLECTOR RING MOUNT

James R. Moorehead, Renton, and Richard S. Reinhold, Seattle, Wash., assignors to Boeing Airplane Company, a corporation of Delaware Application September 27, 1946, Serial No. 699,834

9 Claims. (Cl. 60—29)

The present invention relates to collector rings, more particularly exhaust collector rings, for use with radial engines upon airplanes.

Exhaust collector rings which are mounted upon the engine mount ring do not vibrate, especially torsionally, in consonance with the engine, independently and somewhat resiliently mounted on that same mount ring, to which engine the collector ring is connected. Joints having material flexibility are necessarily employed between each engine cylinder and the collector ring and/or between each segment of the collector ring and those adjoining, in such installations. In other installations it was considered preferable to mount the rigid collector ring rigidly upon the engine, to oscillate torsionally therewith, but this rigid mounting produces high loads in the exhaust collector ring and its mounts, upon its motion with the engine with respect to the engine's mount, and the designer must normally assume a load factor of 100 in designing such collector rings and their mounts. Because of such loads and such design factors, the collector rings as heretofore thus mounted have been essentially strongly reinforced, particularly with local reinforcements at attaching points, and because of these and of the expected high loading, the over-all weight of the collector ring and its mounting has become unreasonably high.

The present invention departs from prior practice, and in particular departs from the rigid mounting discussed, in that while the collector ring is supported upon and from the engine, and oscillates therewith, it is substantially rigid as a whole, but is so mounted that it may have its own movement as a whole, particularly torsionally and in one other direction, with relation to the engine through the medium of the flexible mountings by which it is supported from the engine, and with some flexibility in the small stacks individual to the respective engine cylinders. By so doing the loads are markedly reduced, with the result that its own weight may be decreased, and this further reduces the stresses, and permits further lightening of the structure, and this constitutes one of the primary objects of the invention, so to lessen the loads and to lighten the structure.

The present invention produces a further advantage, by reason of the flexibility of the ring's mount, upon thermal expansion of the ring and of the engine, which expansion is at unlike rates. According to the present invention the mounting of the ring is such that it has a certain freedom of diametral or radial expansion relative to the engine whereon it is mounted, within limits, and thereby stresses are further reduced and loads are lessened, and the weight over-all may be decreased.

As has been mentioned, the former rigid mounts of the exhaust collector ring supported the ring by means of the inlet connections from each cylinder to the ring. Notwithstanding welded reinforcements at the juncture of the inlets to the ring, there still existed localized stresses of very considerable amount. A further object of the present invention is to provide a mount for such a collector ring from a radial engine, which better distributes these mounting forces, which in turn lessens the load and permits elimination of weight.

The present invention also to a certain degree, divorces the mass of the collector ring from the large mass of the engine, and employs the collector ring as a torsion dampener upon the torsional movements of the engine, and thereby the loads upon the engine mounts may be correspondingly reduced, and this is a further object of the invention.

Sectional exhaust collector rings are desirable, since they afford the greatest facility for servicing the engine. However, it has been considered most necessary, if the collector ring is to be formed in sections, that each section be rigidly joined to its individual cylinder, but to be joined only flexibly to adjoining sections. With single-row engines this was feasible, but with the advent of multi-row engines so many complications develop as to make it wholly impracticable. It is a further object of the present invention to provide such a collector ring and a mount therefor, adapted to multi-row engines though not confined thereto, which permits a sectional ring, which is inherently substantially rigid, to be mounted for movement with, but also with relation to the engine, and indeed, it is an associated object to arrange the radial engine, the sectional exhaust collector ring, and the mount for the latter in such a way that the cooperative action of the sections of the exhaust collector ring serves to damp the movements of the collector ring with respect to its mount.

Likewise it is an object of the present invention to provide such mounting means, mechanically so arranged as to afford ease of assembly and disassembly, and which in addition will secure and urge aligned sections firmly together, and prevent the probability of leakage at the joints.

With these objects in mind, and others, particularly such as pertain to the more purely mechanical details of the invention, as will appear more clearly hereafter, the invention comprises the novel combination and arrangement of the collector ring upon the engine, and of the parts of the ring relative to one another and to the engine, to the ends indicated, as well as the novel parts themselves, and subcombinations thereof, all as shown in the accompanying drawings in a typical and representative form, and as will be more fully described and claimed hereinafter.

Figure 1:
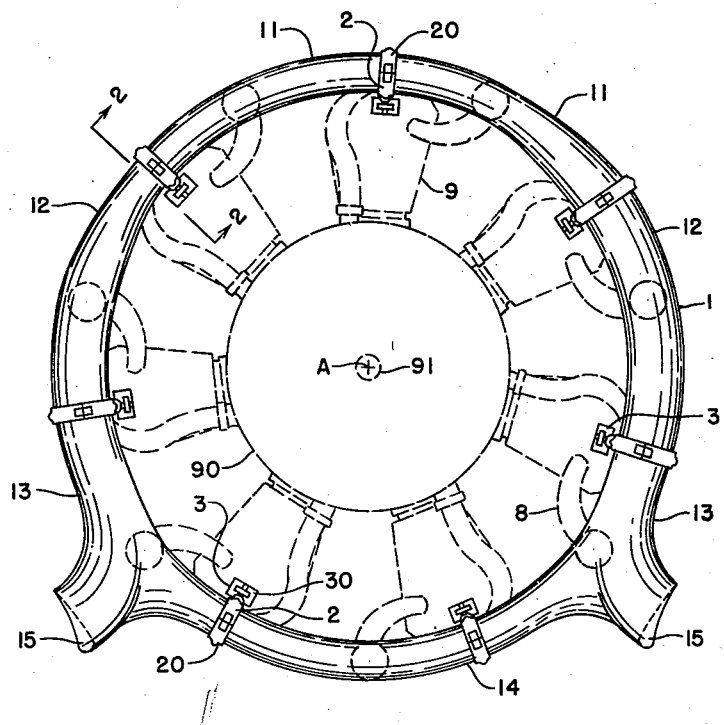
Figure 1 is an end elevation, in this instance a rear view, of a radial engine and a collector ring mounted thereupon in accordance with the principles of this invention.
Figure 5:
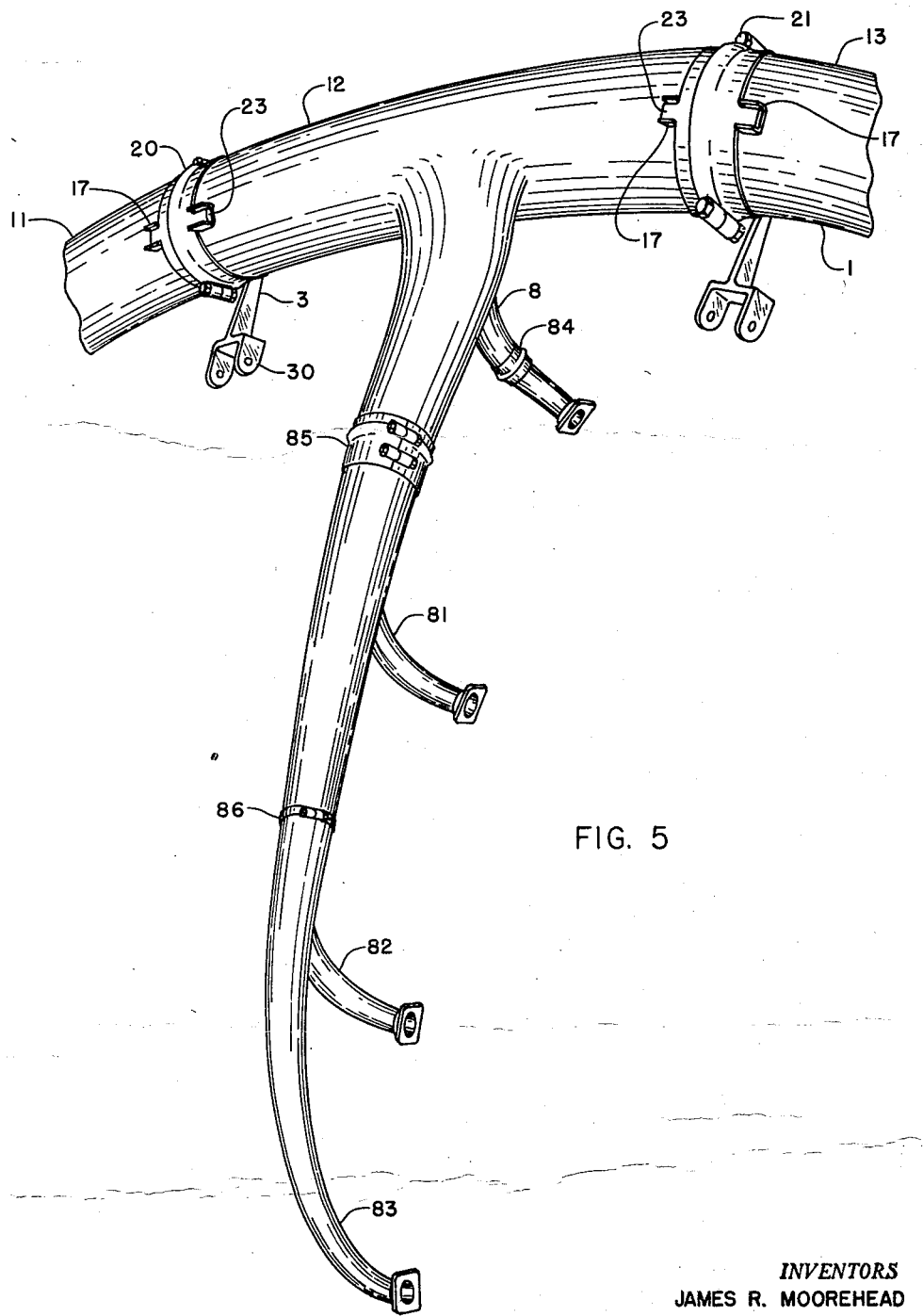

Figure 5 is a perspective view of the exhaust inlet stacks and manifold leading to, and the collector ring sections adjoining, one such section of a four-row engine. A typical radial engine is conventionally shown in dotted lines in Figures 1 and 2. This may be taken as a single-row engine, or as the rear row of a multi-cylinder engine. It includes the crank casing 90 through which the shaft 91 protrudes, rotating about the engine's axis A, and the several radially disposed cylinders 9 fixed upon and usually individually separable from the crank case 90, each of which cylinders has a cylinder head 92 and a bracket 93 adjacent to or carried by its rocker boxes. Other nonpertinent details of the engine have been omitted. Each aligned cylinder of a four-row engine is provided with an exhaust outlet port, to which is connected the outlet stacks 8, 81, 82, and 83 (see Fig. 5), leading to or forming part of an inlet manifold leading to a connection to the exhaust collector ring. Normally there would be provided flexible or slip joints 84, 85, or 86 in these individual exhaust stacks or between manifold sections, in a manner which is known, or in any suitable manner. The purpose of this is to permit relative movement of the exhaust collector ring and the engine in manners and directions such as will shortly be clear.

The exhaust collector ring, designated 1 as a whole, is formed of a plurality of sections, such as 11, 12, 13, and 14. While one section may serve more than one cylinder, or may be connected to a manifold serving several aligned cylinders in different rows, each section is preferably individual to and connected by an exhaust stack 8 to one particular cylinder 9, or by stacks 8, 81, 82, and 83 to one row of aligned cylinders. These several circularly arranged sections are normally of progressively increasing diameter angularly from the most distant cylinder to the cylinder nearest the manifold connection at 15, or other outlet from the exhaust collector ring. The exhaust collector ring shown is arranged in a completely closed circle, but the principles of the invention would be applicable with equal facility to an exhaust collector ring which extends substantially but not completely about the engine, should that construction be considered desirable.

Each such section is aligned with an adjoining section for passage of gas from one to the other. To retain the sections in such alignment, and for another purpose which will shortly appear, it is preferred that clamping rings be provided, made up of the two halves 2 and 20 secured together, as by bolts 21 at the opposite sides. Thus the clamping rings 2, 20 completely encircle the abutting ends of adjoining or aligned sections, and these rings preferably constitute the sole support of the collector ring from the engine, through mounting means which will shortly be described. Moreover, these clamping rings not only span the joint between two aligned sections, but serve also to urge them together. The clamping ring is channeled, as indicated at 22, and each collector ring section has its end circumferentially beaded, as indicated at 16, the whole being so organized and arranged that when the clamping ring 2, 20 is constricted about the adjoining ends of the sections, the two beads 16 are received within the one channel 22, and by the latter are urged endwise toward one another, to press the ends of the aligned sections close together.

Figure 2:
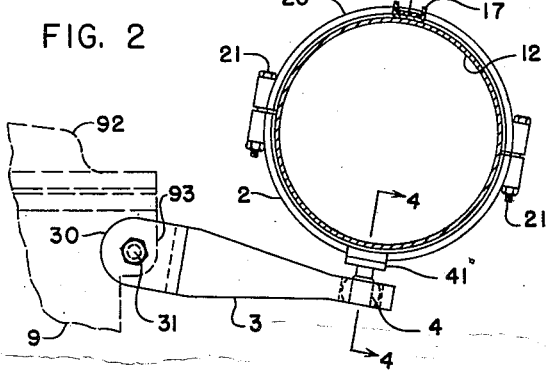
Figure 2 is a cross sectional view through the collector ring, showing the manner of its mounting upon an engine cylinder, the view being taken substantially from the viewpoint indicated by the line 2—2 of Figure 1.
Figure 3:
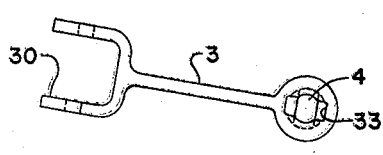
Figure 3 is a view in the nature of a plan view of the mount arm shown in Figure 2.

The mount for the collector ring includes an inclined arm 3, which has a web of some considerable depth, but which is relatively thin so that it has some transverse flexibility; compare Figures 2 and 3. At one end, as indicated at 30, it is forked to straddle a lug 93 adjacent the engine cylinder's rocker box, whereby, through a pivot bolt 31 or the like, the arm 3 may have pivotal movement in a radial plane through the axis of the engine, or, in other words, the arm 3 may swing radially inwardly toward or outwardly away from the engine's axis A. Generally speaking, each such arm extends lengthwise of the engine's axis, and may, under some conditions, be substantially parallel thereto.

While the pivotal connection between the forked end 30 and the engine cylinder constrains the arm to movement in a radial plane, and any movement of the arm transversely of its arc of swing must result from its flexure, it is preferred that the interconnection between its outer or swinging end and the collector ring (or, more specifically, the individual clamping rings) be such as will permit relative movement about at least two axes. One such axis is generally radial from the engine's axis, so that in effect the movement is rotational in a tangential plane, and the other such axis is a transverse tangential axis. It is understood that the above refers to each individual mount, and that these mounts are spaced angularly about the engine's axis A, preferably one such mount being provided for each cylinder and for the two collector ring sections which abut in this vicinity.

Figure 4:
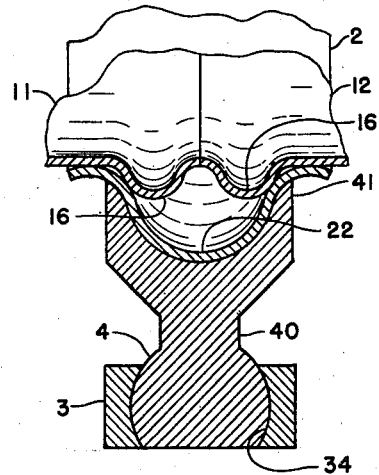
Figure 4 is a detail section at 4—4 of Figure 2, illustrating the interconnection between the mounting arm and the clamp ring at the collector ring.

The type of connection chosen and illustrated herein is a ball and socket joint, wherein the ball 4 is connected by a short shank 40 and saddle 41 to the clamping ring or the half 2 thereof, to the latter of which the saddle 41 is welded or otherwise permanently secured. The socket 34 is formed in the outer end of the arm 3, and closely embraces the ball 4, except as the ball is truncated diametrically opposite the shank 40; see Figure 4.

For convenience of assembly and disassembly it is preferred that the ball 4 be additionally truncated, or flattened, as may be seen in Figure 3, by slicing off zones, at two opposite sides, in planes at right angles to its truncated end referred to above to leave only its intervening portion, with spherical surfaces fitting the socket 34, bounded by parallel flat surfaces. The socket 34 may have an entrance 33 disposed transversely to the normal position of the so-flattened ball and its parallel flat surfaces as it rests within the socket, whereby, by turning the ball to this transverse position, it may be inserted into or withdrawn from the socket 34 through this transverse slot 33. Once engaged and turned to its normal position, the ball may not be withdrawn from the socket, and so it constitutes a satisfactory support, yet is readily disengageable when required.

The clamping rings might be left free for some rotation about the cross-sectional periphery of the collector ring 1, but preferably each clamping ring 2, 20 is located and held in a fixed position, against such rotation. One purpose of so doing is to locate the ball 4 correctly relative to its socket 34, so that its shank 40 does not lie against the edge of the socket, but has adequate freedom of movement in all directions. To effect this result the clamping ring may have lugs or ears 23 receivable in channeled seats 17 welded externally of the collector ring sections, at their ends.

The interlock thus afforded, directly from one ring section, as 11, to the adjoining section, as 12, by way of the clamping ring and its lugs 23, serves to prevent twisting movement of one collector ring section relative to another, peripherally of its cross-section. The collector rings are further locked together against separation axially of the sections by the channel 22 spanning the two beads 16. The combined result is that the collector ring becomes substantially unitary, though made in sections, and relative movement of its component sections, and wear between them, is virtually eliminated.

The forces tending to cause movement of the collector ring relative to the engine, or vice versa, are actually varied, and fairly numerous when fully analyzed. However, it is not necessary here to analyze all of them, since the purposes of the present invention, and the manner in which it meets the problems involved, can be made clear by reference to the relative torsional displacement, and to the displacement arising from diametral expansion of the ring under thermal conditions.

When the collector ring 1 is cold it will be of the smallest diametral extent, and when it warms up it will tend to expand diametrally. It will grow radially in all directions. The engine will not expand to the same degree; therefore the collector ring 1 tends to grow with respect to the engine, or, as viewed in Figure 2, the collector ring tends to move upwardly with respect to the engine cylinder 9. The flexible joints 84, 85, and 86 in the exhaust inlet manifolds insure that the collector ring may so move, without stress. This diametral expansive movement of the collector ring entrains outward swinging of the swinging ends of the arms 3, or, as viewed in Figure 2, this particular arm would move upwardly. Since obviously the substantially unitary collector ring will tend to maintain the initial positional relationship of its parts, this diametral expansion and resultant swinging of the arms 3 will cause each ball 4 to rock within its socket 34 about a tangential axis, that is, about an axis which is parallel to the axis of the pivot at 31. Were it not for this freedom to rock about a tangential axis at the ball, it is clear that stresses of considerable value would be set up between each arm 3 and the collector ring. With the two pivotal movements, one at 31 and the other at the ball, parallel to the pivot at 31, the collector ring is free to expand or grow, and to contract with respect to the engine, without setting up any appreciable stresses.

Considering now torsional vibration of the engine, as the engine vibrates or tends to rotate bodily about its own axis, the inertia of the collector ring 1 causes it to lag with respect to such torsional movement of the engine. The first result is flexure in each of the arms 3, and it is not desirable to eliminate this, for this tends to reduce the forces acting upon the engine itself, and to produce a restoring and damping force. By reason of the movement of the engine relative to the ring 1, or vice versa, each ball tends to rotate within its socket 34 about a radially disposed axis. Were it not for this permitted movement, and were the arms secured to the collector ring 1 as rigidly in consideration of this torsional vibration as they are so connected to the engine, there would result simultaneous double flexure of the arms, and much greater likelihood of failure, or necessity for greater strength and added weight. By the mount described the ring 1 is permitted to rotate torsionally with respect to the engine, and to be restored by reverse torsional movement, with only the frictional resistance within the ball socket, and without the production of undue stresses within the mount as between the collector ring and the engine.

The supporting forces on the ring are distributed about its cross-sectional periphery, rather than being concentrated at a single point of application. This is true by reason of the employment of the clamping rings and the mounting of the ball 4 upon the latter, rather than connecting the ball directly to the collector ring itself, or to any section thereof. The assembly is such as reduces the number of parts, it is believed, to the minimum, and to a minimum in weight.

We claim as our invention:

1. A generally circular exhaust collector ring for radial engines, said ring having inlets from the several engine cylinders, a plurality of generally axially extending mounting arms angularly disposed about the engine's axis, and each pivotally mounted upon the engine for movement substantially in a radial plane, and means having freedom of movement under the influence of forces acting radially of the engine's axis, connecting the swinging end of each arm with said collector ring.

2. A generally circular exhaust collector ring for radial engines having flexible inlets from the several engine cylinders, a plurality of generally axially directed mounting arms disposed about the engine's axis, and each pivotally mounted upon the engine for movement substantially in a radial plane, each such arm having limited flexure transverse to its arc of swing, and means connecting the swinging end of each arm with said collector ring, and formed and arranged for limited freedom of relative movement between its ring section and its engine mount under the influence of torsionally induced forces about the engine's axis, and of forces acting radially of the engine's axis.

3. Means to mount an exhaust collector ring upon a radial engine, comprising a plurality of arms spaced angularly about and extending generally in the direction of the engine's axis, means for pivotally mounting one end of each arm upon the engine for swinging of its opposite end inwardly towards and outwardly from the engine's axis, each arm having limited flexibility transverse to its arc of swing, a ring attachment member carried by the collector ring adjacent the swinging end of each arm, and means interconnecting each such attachment member and the swinging end of the adjacent arm for limited free torsional movement of the collector ring relative to the arms, and for limited pivotal movement about tangential axes, due to radial expansion of the collector ring relative to the engine.

4. Means to mount an exhaust collector ring upon a radial engine, comprising a plurality of ring attachment members carried by said collector ring at angularly spaced intervals, a like number of arms extending generally longitudinally of the engine's axis, and spaced angularly thereabout to lie at one end adjacent each ring attachment member, means for pivotal securement of the other end of each arm upon the engine for swinging inwardly towards and outwardly from the engine's axis, each such arm being limitedly flexible transverse to its arc of swing, means mounting each ring attachment member upon the swinging end of the adjoining arm for relative pivotal movement about each of at least two axes, one whereof is radial to the engine's axis, and the other whereof is tangentially disposed.

5. In combination with a generally circular exhaust collector ring or the like, mounting means therefor comprising a plurality of angularly spaced ring attachment members secured to said collector ring, an arm disposed adjacent each ring attachment member, the several arms extending generally longitudinally of but normally inclined with respect to the engine's axis, means for pivotal securement of the corresponding end of each arm at the engine for swinging inwardly towards and outwardly from the engine's axis, about a tangential pivot axis, each arm having limited flexibility transverse to its arc of swing, and a ball and socket mount joining the swinging end of each arm with the ring attachment member adjacent thereto.

6. A generally circular exhaust collector ring for radial engines, having inlets spaced angularly at intervals for connection to the several engine cylinders, a plurality of generally axially directed mounting arms disposed angularly about the engine's axis, and each pivotally mounted upon the engine for movement in a generally radial plane, each such arm being relatively rigid in its plane of swing, but having limited resilient flexibility transverse to its arc of swing, under the influence of torsionally induced forces about the engine's axis, applied to its outer end, and means connecting the swinging end of each arm with said collector ring, each such connecting means being formed and arranged for relative pivotal movement between the collector ring and each mounting arm about an axis transverse to the arc of swing, and hence parallel to the arm's pivotal mount upon the engine, under the influence of forces such as thermal expansion or contraction of the collector ring as a whole, and likewise formed and arranged for limited rotational movement of the collector ring bodily about individual axes through the swinging ends of the several arms, located generally parallel to the engine's axis, as a result of torsionally-induced flexure and reaction of the arms.

7. An exhaust collector ring as in claim 1, including at least one flexible joint in each of the several inlets, whereby said inlets yield to forces acting to displace the collector ring relative to the engine, and the mounting arms constitute the primary support for the collector ring.

8. An exhaust collector ring as in claim 1, wherein the collector ring is formed of a plurality of component sections each of limited circumferential extent, end-abutted to adjoining sections to complete the collector ring, clamp rings encircling the abutted section ends at each such joint, to retain them against separation, and a ring attachment member carried by each of said clamp rings, constituting the sole means which is carried by the collector ring for connecting the swinging end of each arm with the collector ring.

9. An exhaust collector ring as in claim 5, wherein the collector ring is formed of a plurality of component sections each of limited circumferential extent, end-abutted to adjoining sections, clamp rings encircling the abutted section ends at each such joint, to retain them against separation, each clamping ring mounting one of the component elements of the corresponding ball and socket mount, for connection and primary support of the collector ring from the several arms.

JAMES R. MOOREHEAD.
RICHARD S. REINHOLD.

REFERENCES CITED

The following references are of record in the file of this patent:

UNITED STATES PATENTS

| Number | Name | Date |
|---|---|---|
| 958,052 | Williams | May 17, 1910 |
| 1,077,741 | Neveu | Nov. 4, 1913 |
| 1,782,779 | Fullman | Nov. 25, 1930 |
| 1,896,095 | Niven | Feb. 7, 1933 |
| 2,022,982 | Sikorsky | Dec. 3, 1935 |
| 2,271,059 | Boulton | Jan. 27, 1942 |
| 2,284,334 | Mercier | May 26, 1942 |
| 2,309,281 | Steele | Jan. 26, 1943 |
| 2,388,924 | Mercier | Nov. 13, 1945 |
| 2,426,423 | Woolsey | Aug. 26, 1947 |